United States Patent [19]

Fujii et al.

[11] 4,392,535

[45] Jul. 12, 1983

[54] ZERO-POINT ADJUSTING METHOD FOR AUTOMATIC WEIGHING APPARATUS

[75] Inventors: Kunihiko Fujii; Yukihiro Hirosaki, both of Mishima; Yoshihisa Nishiyama, Shimizu Suntoh; Koichiro Sato, Mishima, all of Japan

[73] Assignee: Tokyo Electric Co., Ltd., Tokyo, Japan

[21] Appl. No.: 355,340

[22] Filed: Mar. 8, 1982

Related U.S. Application Data

[63] Continuation of Ser. No. 117,786, Feb. 1, 1980, abandoned.

[30] Foreign Application Priority Data

Feb. 6, 1979 [JP] Japan ............................ 54-13110

[51] Int. Cl.³ .............................................. G01G 11/04
[52] U.S. Cl. ........................................ 177/1; 177/25; 177/145; 177/165
[58] Field of Search ............ 177/1, 25, 50, 145, 177/164, 165; 364/466, 567; 73/1 B

[56] References Cited

U.S. PATENT DOCUMENTS

| 2,974,518 | 3/1961 | Jones | 73/1 B |
| 3,439,524 | 4/1969 | Rogers | 73/1 B |
| 3,656,337 | 4/1972 | McDonald | 73/1 B |
| 4,049,068 | 9/1977 | Kavanagh | 177/25 |
| 4,231,439 | 11/1980 | Hall | 177/25 |

Primary Examiner—Joseph W. Hartary
Attorney, Agent, or Firm—Oblon, Fisher, Spivak, McClelland & Maier

[57] ABSTRACT

In an automatic weighing apparatus wherein a weight measurement is performed by passing a commodity on a weighing conveyor which is coupled so as to become a load of a load cell, and a label on which data based on the measured value are printed is automatically stuck to the commodity, while a print fixing label in which a print content is fixed can also be issued; the zero-point setting is automatically performed at times when the commodity does not exist on the weighing conveyor, so as to execute in a stable state a measurement having an accurate reference point.

6 Claims, 13 Drawing Figures

Figure 2A:
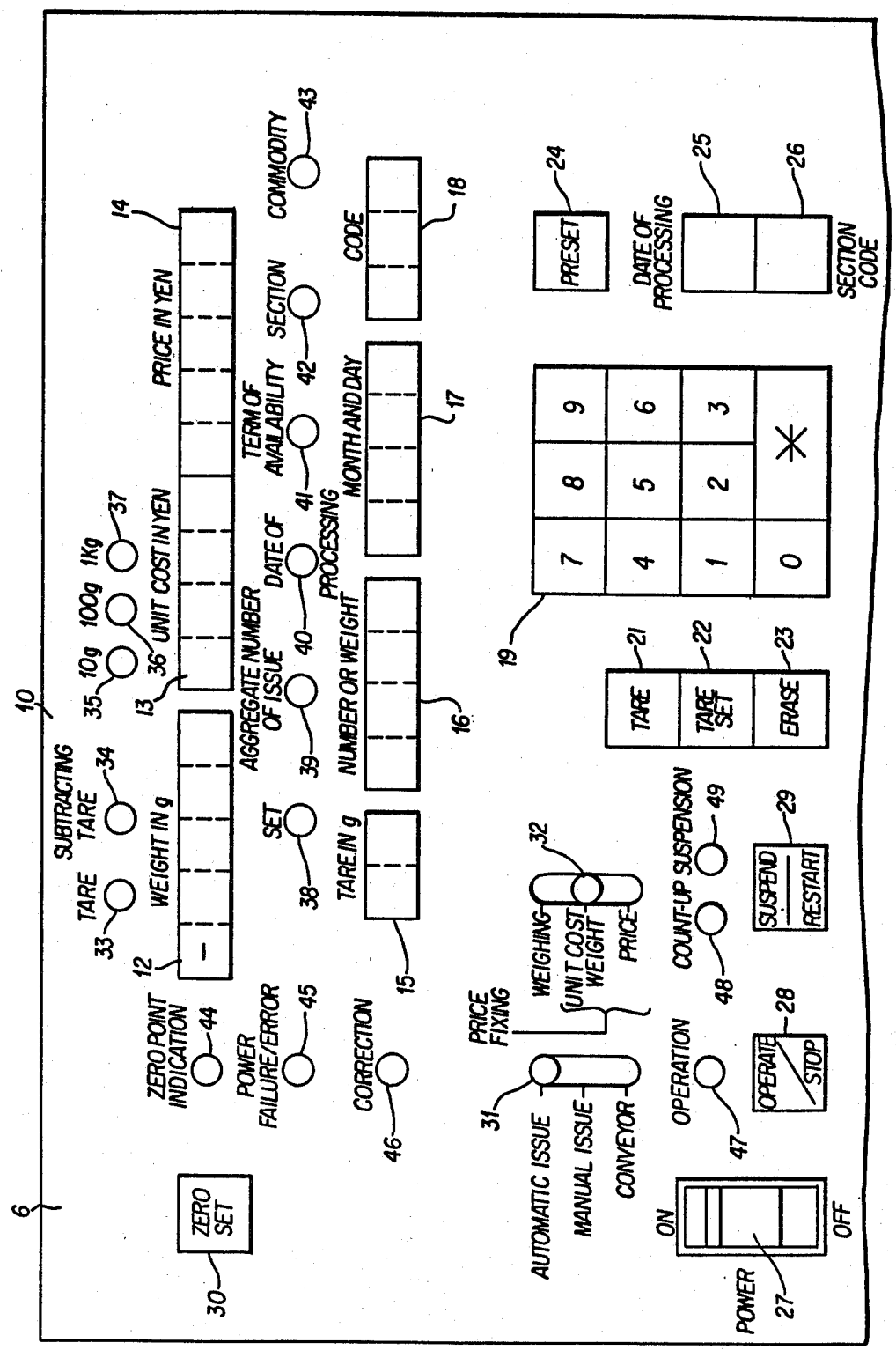

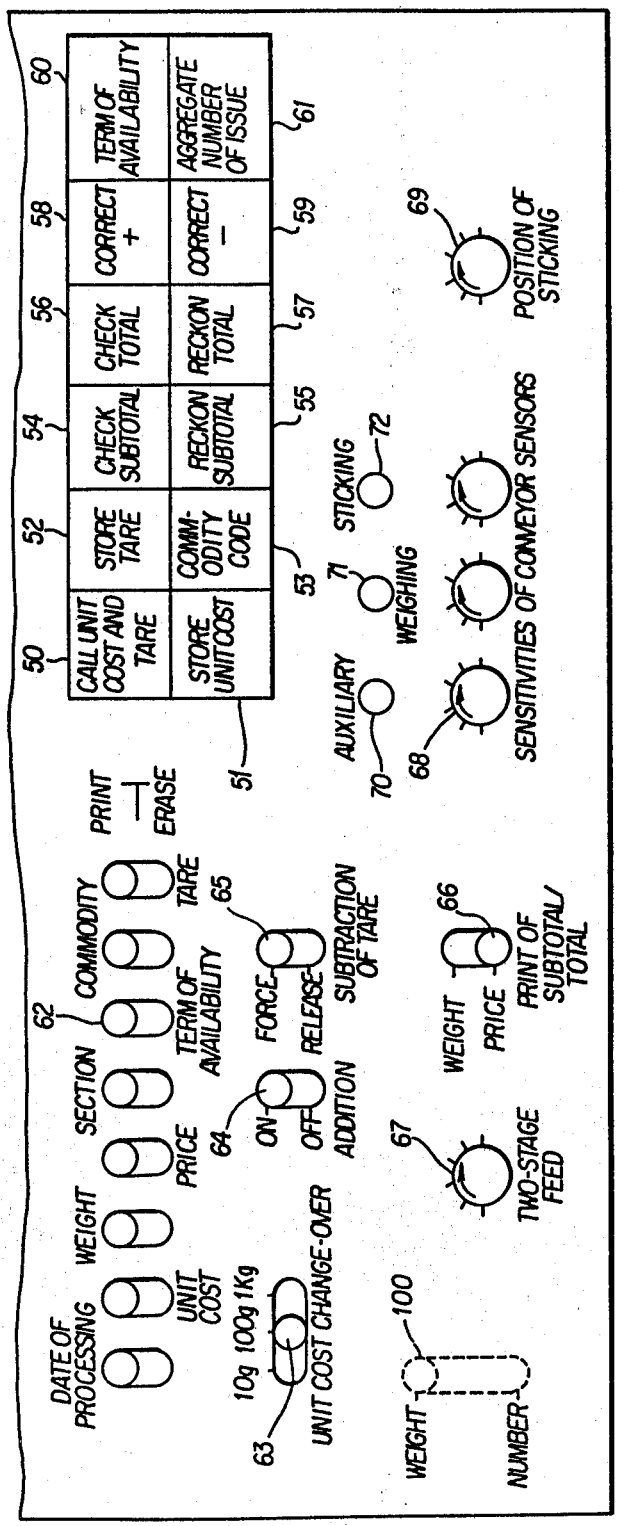
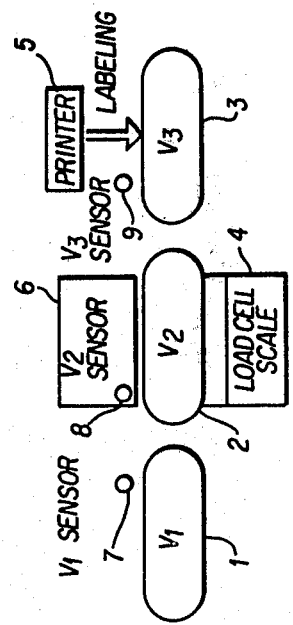
FIG. 2(B)
FIG. 1

ZERO-POINT ADJUSTING METHOD FOR AUTOMATIC WEIGHING APPARATUS

This is a continuation of application Ser. No. 117,786, filed Feb. 1, 1980 now abandoned.

This invention relates to a zero-point adjusting method for an automatic weighing apparatus wherein the weight of a commodity is measured by the use of a load cell and wherein a label on which data based on the measured value printed is automatically stuck to the commodity.

Heretofore, in a scale employing a load cell, the zero point setting has been performed before weighing without fail, whereupon data have been obtained. However, when the zero point setting is executed only once before the weighing, accurate measurement data cannot be obtained. More specifically, the load cell has a disadvantage that on account of its characteristics, its output is liable to fluctuate even when it weighs an identical object. Especially, a fluctuation at the closure of power supply is greater. This is because, although the difference between the output at no-load, i.e., the count value of the zero point and the count value based on the weighing undergoes no change, the output at no-load is changed by external conditions ascribable to fluctuations in unstable factors and the ambient temperature immediately after the closure of the power supply, so that deviations are involved in the measured data. In the automatic weighing which is performed by placing a conveyor on the load cell, even when the zero point has been adjusted at the stop of the conveyor, it sometimes changes at the restarting of the conveyor.

A first object of this invention is to obtain measurement values based on the accurate reference zero point at all times even when a change in the ambient temperature, local temperature changes of the apparatus, etc. have occurred.

A second object of this invention is to execute the zero point setting automatically at times when no commodity exists on the weighing conveyor, so as to obtain accurate reference values even in a long time usage.

A third object of this invention is to make it possible to generate an error signal and give warning when a load value is greatly different from a zero point already set at the zero point setting.

A fourth object of this invention is to perform the zero point setting at times when no commodity exists on the weighing conveyor, even in the manual issue which does not require the weighing, and thus to prevent a sharp change of the zero point setting even when the manual issue is shifted to the automatic weighing.

A fifth object of this invention is to keep a load cell in its operative state even on the automatic print fixing, and thus to prevent any abrupt change of the operating characteristics of electric circuit components from occurring when the automatic print fixing is shifted to the automatic weighing.

A sixth object of this invention is to utilize a weighing conveyor as a transportation conveyor in the print fixing.

Figure 3:
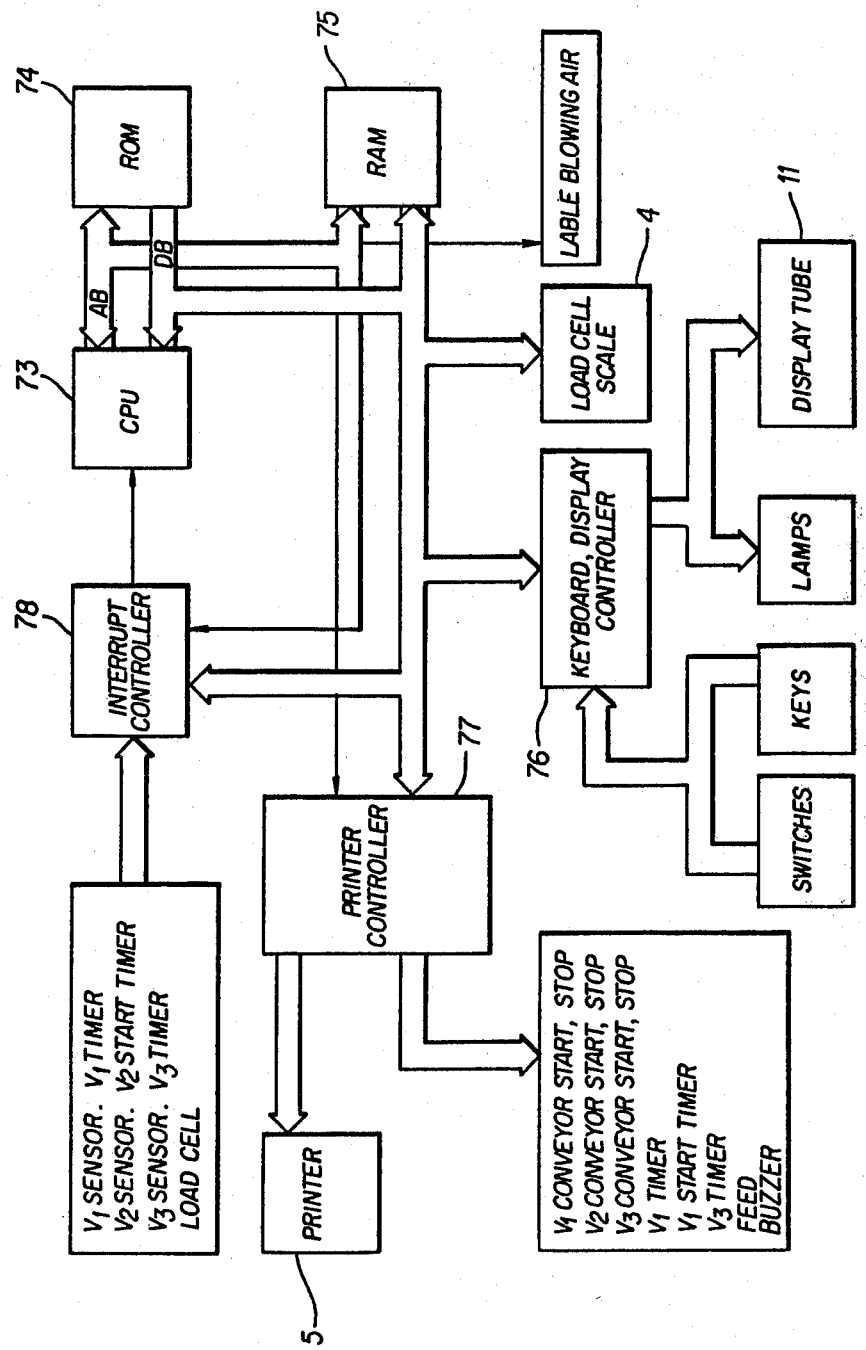
Figure 4:
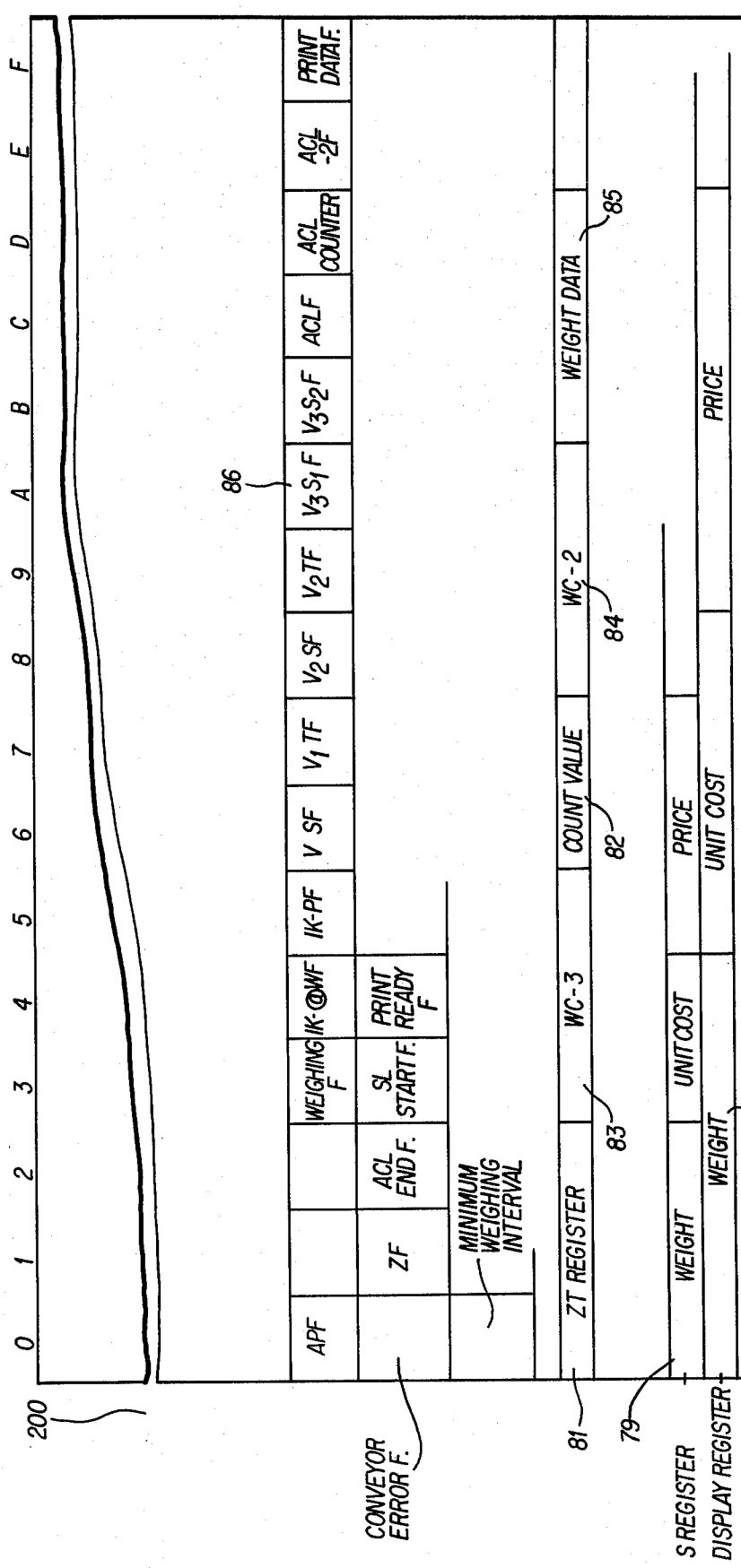
Figure 5:
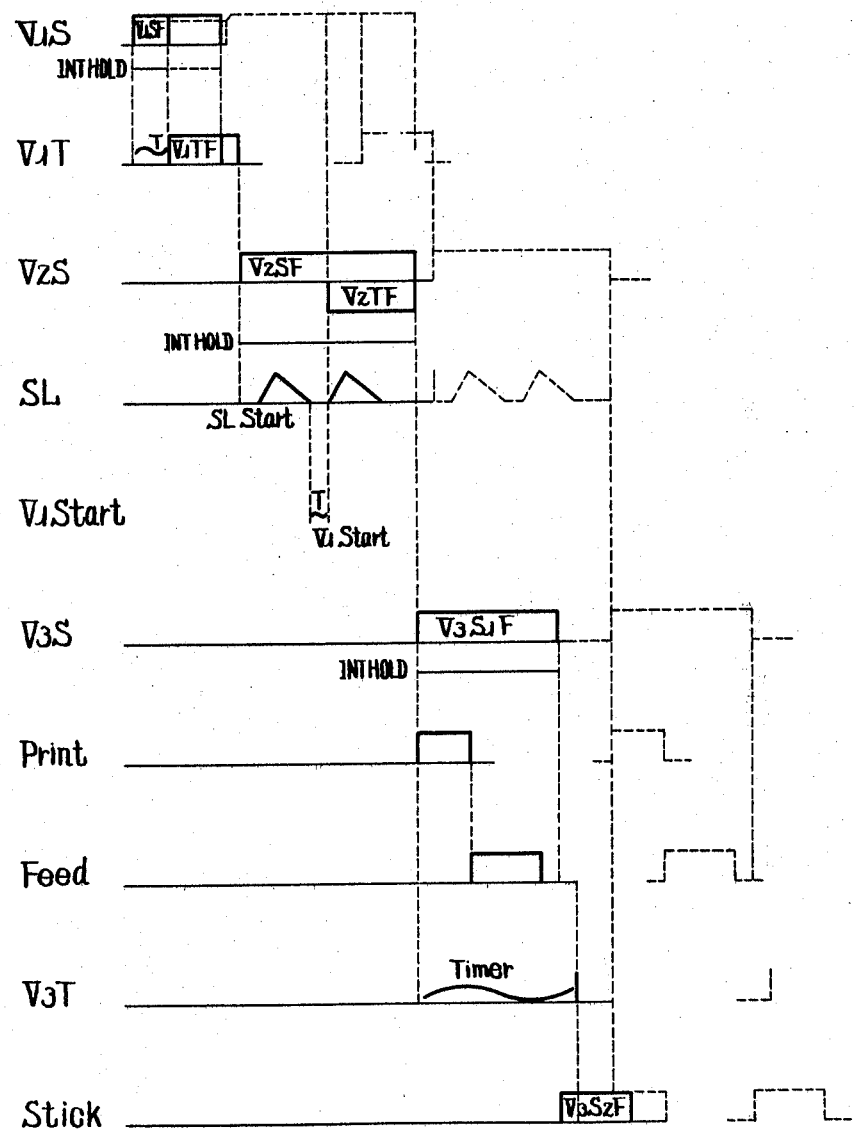
Figure 6:
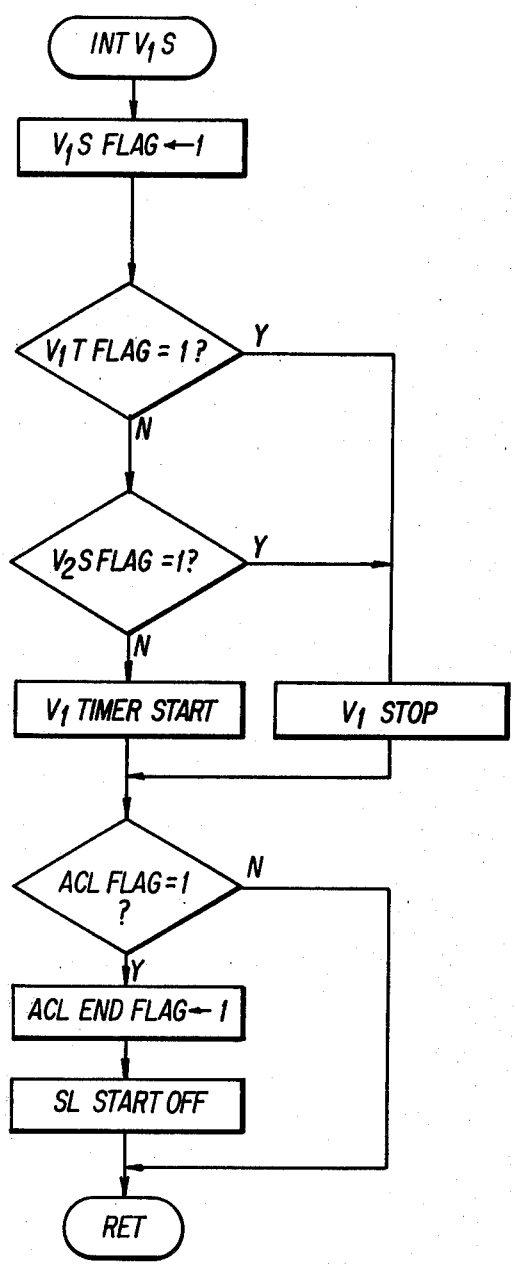
Figure 7:
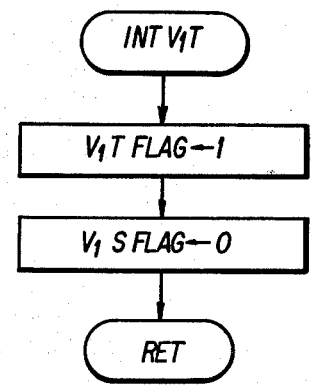
Figure 11:
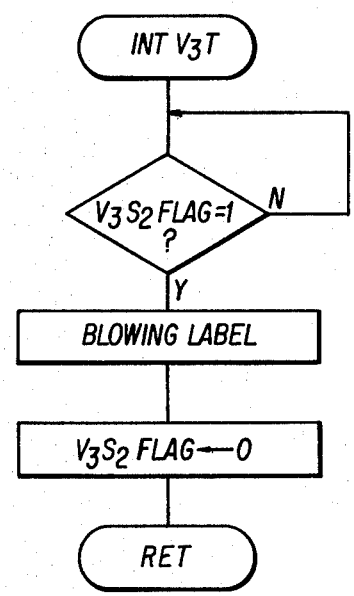
Figure 8:
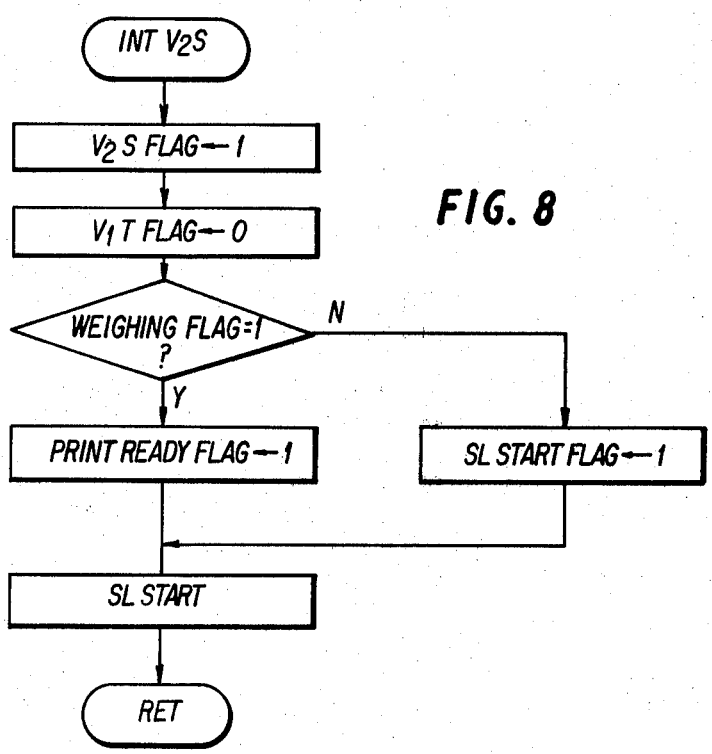
Figure 9:
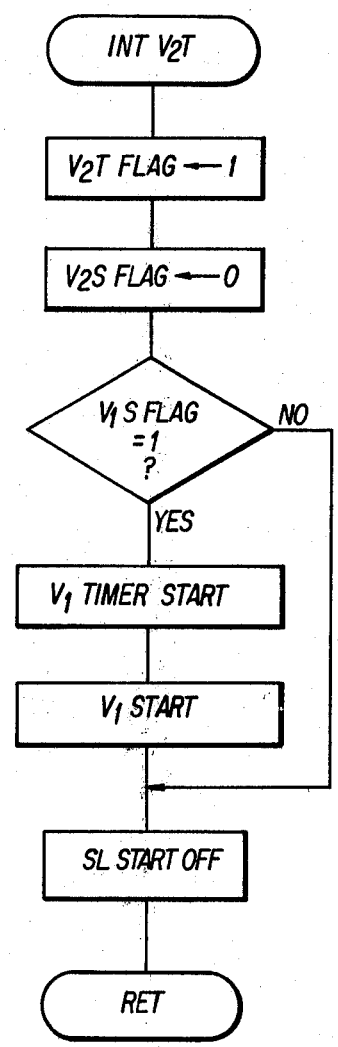
Figure 10:
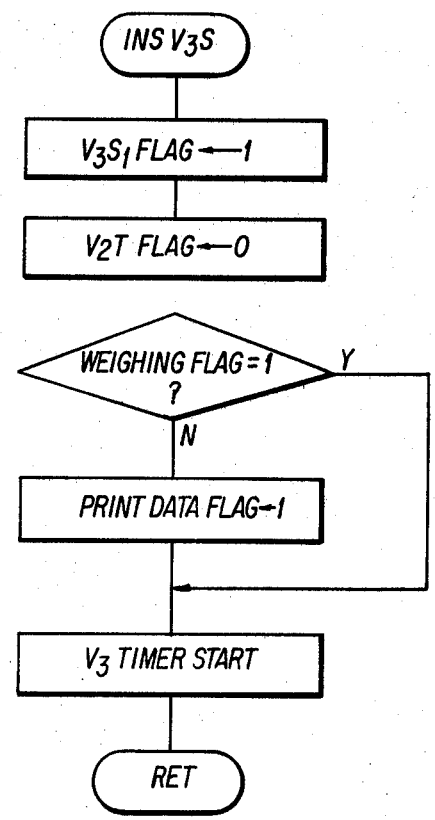
Figure 12:
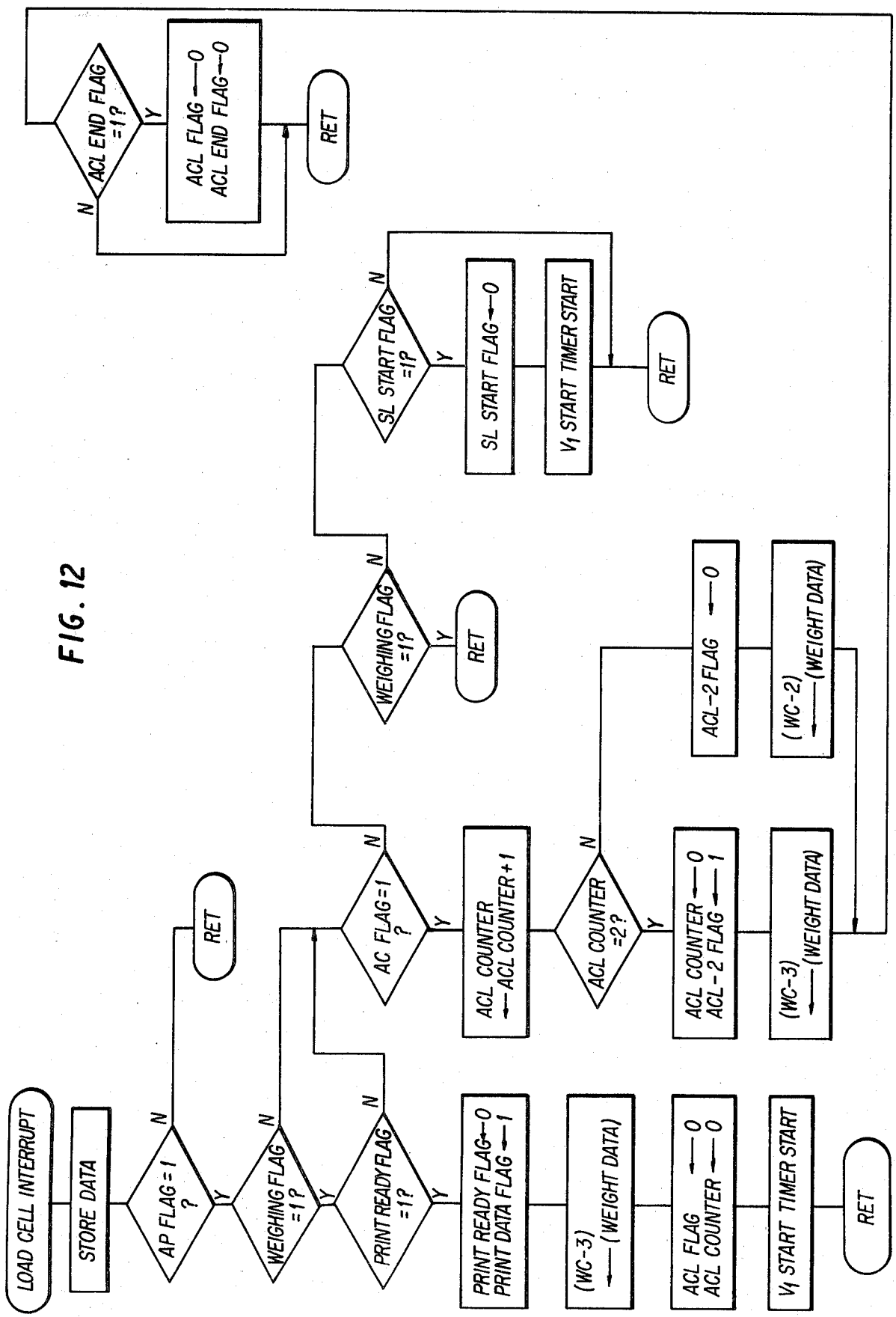
Figure 13A:
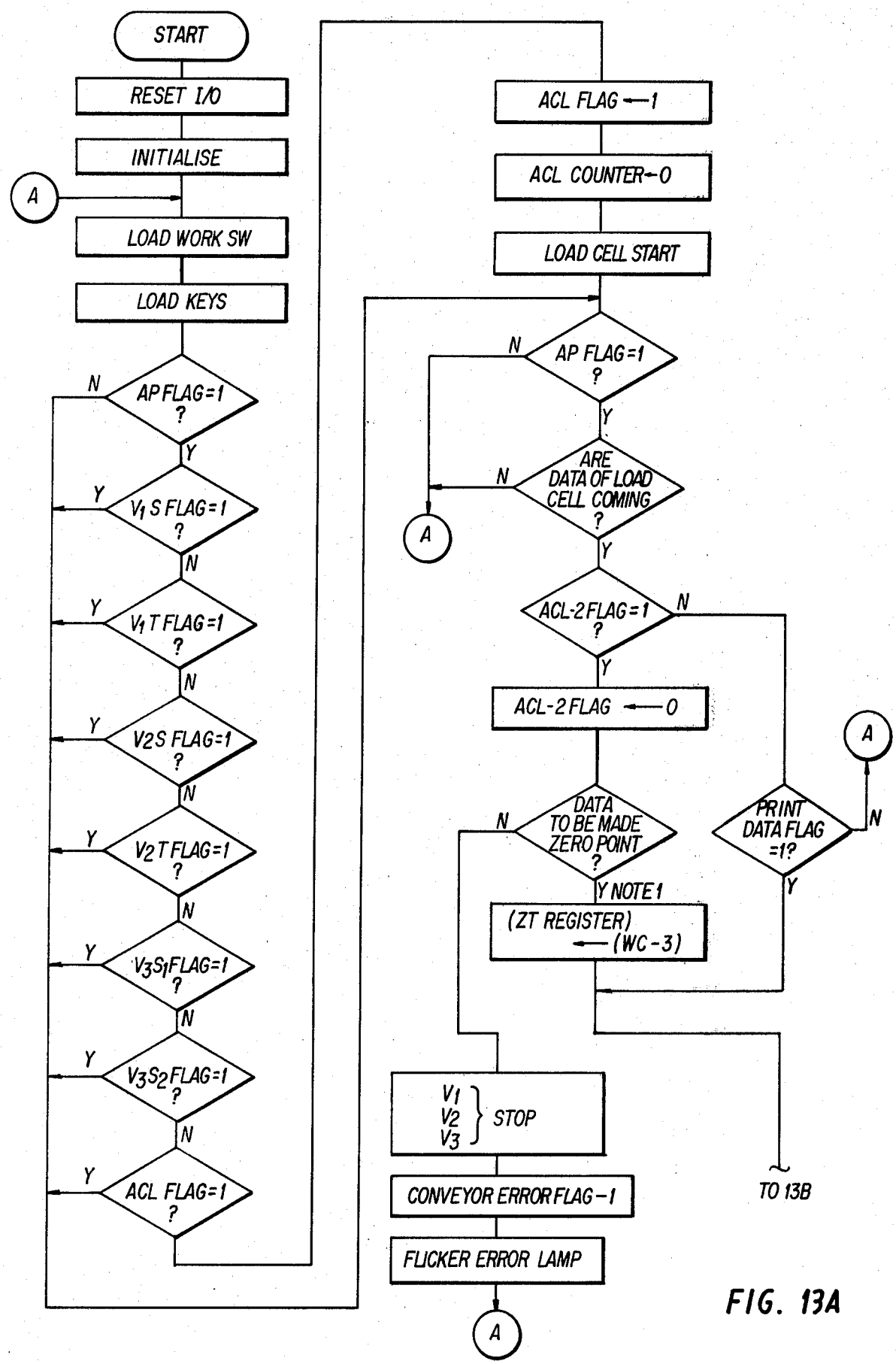
Figure 13B:
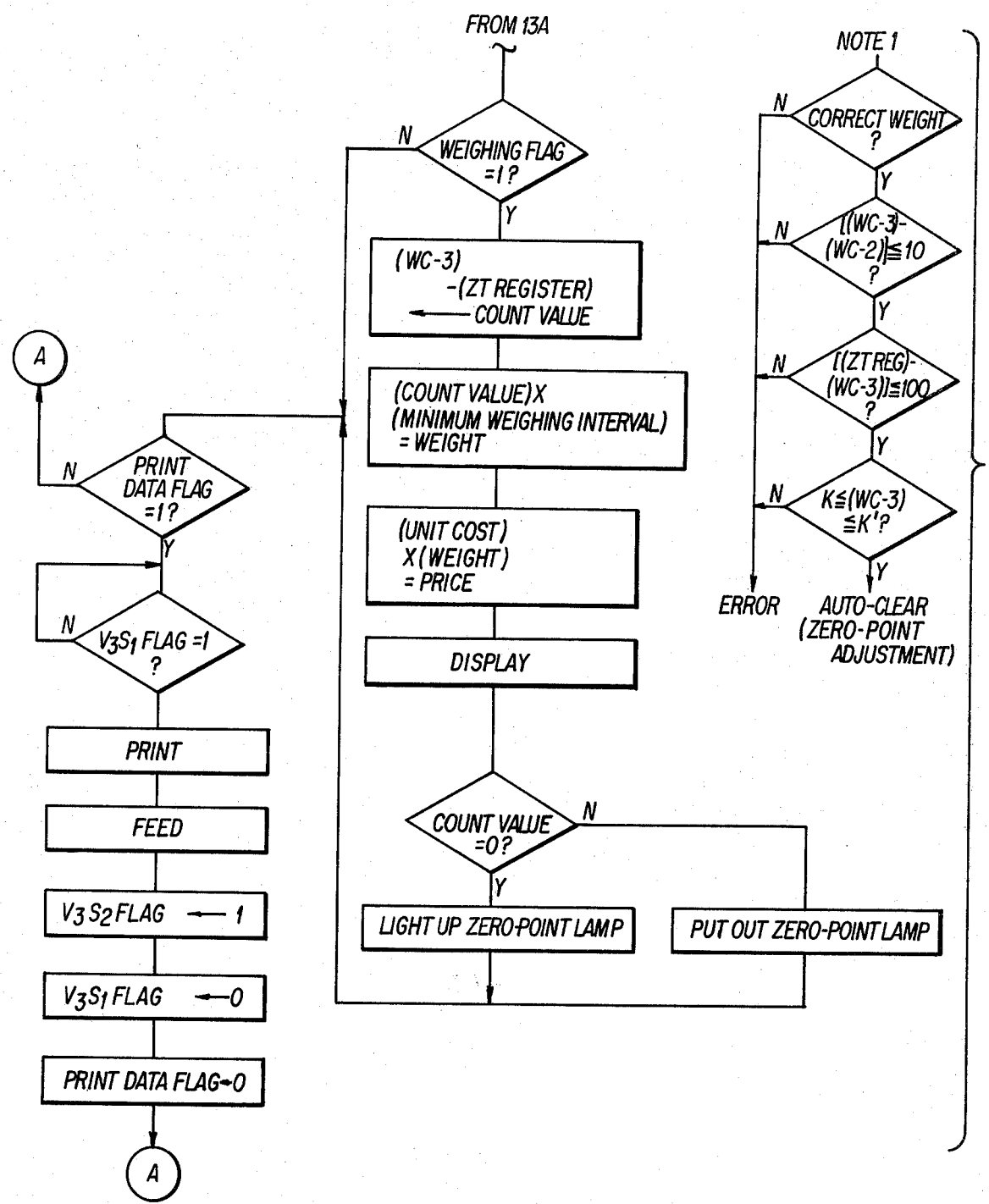

FIG. 1 is a side view showing the outline of an automatic weighing apparatus.
FIG. 2 is a front view of an operation panel.
FIG. 3 is a block diagram of electronic circuitry.
FIG. 4 is a RAM map.
FIG. 5 is a timing chart.
FIG. 6 is a flow chart of the interrupt of a $V_1$ sensor.
FIG. 7 is a flow chart of the interrupt of a $V_1$ timer.
FIG. 8 is a flow chart of the interrupt of a $V_2$ sensor.
FIG. 9 is a flow chart of the interrupt of a $V_2$ timer.
FIG. 10 is a flow chart of the interrupt of a $V_3$ sensor.
FIG. 11 is a flow chart of the interrupt of a $V_3$ timer.
FIG. 12 is a flow chart of the interrupt of a load cell.
FIG. 13 is a flow chart of the main flow.

An embodiment of this invention will be described with reference to the drawings. Shown in FIG. 1 is a diagram of the general construction of an auto-labeling system AL. A conveyor $V_1$ (1), a conveyor $V_2$ (2) and a conveyor $V_3$ (3) are disposed in series. The conveyor $V_1$ (1) functions as a sending-in conveyor for a commodity which is connected to a packaging machine not shown, the conveyor $V_2$ (2) functions as a weighing conveyor which is placed on a load cell SL (4) serving as a scale portion, the weight of the commodity being measured with that of the conveyor $V_2$, and the conveyor $V_3$ (3) functions as a sticking conveyor which sticks labels to the commodities by means of a sticking mechanism of a label printer (5) disposed by the side thereof. By the side of the conveyor $V_2$ (2), an operation unit (6) which is provided with various operating keys and display portions to be stated later is disposed. Over the conveyors $V_1$ (1), $V_2$ (2) and $V_3$ (3), a $V_1$ sensor (7), a $V_2$ sensor (8) and a $V_3$ sensor (9) are respectively disposed to photoelectrically detect the passage of the commodity. The $V_1$ sensor (7) operates to inhibit the transfer of another commodity while the aforecited commodity exists on the conveyor $V_2$ (2).

Now, the construction of an operation panel (10) of the operation unit (6) will be described with reference to FIG. 2. In the upper part of the operation panel (10), display tubes (11) divided into two stages are disposed. The upper stage of the display tubes (11) is subdivided into a weight display portion (12), a unit cost display portion (13) and a price display portion (14), while the lower stage is subdivided into a tare display portion (15), a number or weight display portion (16), a date display portion (17) and a code display portion (18). Below and on the left of such display tubes (11), there are disposed numeral keys of 0–9 (19), an execute key (20), a tare key (21), a tare set key (22), an erase key (23), a preset key (24), a date-of-processing key (25), a section code key (26), a power switch (27), an operate/stop key (28), a suspend—restart key (29) and a zero set key (30). A change-over switch (31) is disposed which effects change-over among automatic issue, manual issue, and conveyor continuous running, while a change-over switch (32) is disposed which effects change-over among weighing, print fixing for unit cost and weight, and print fixing for price. Further, there are disposed various lamps which indicate the items or operating states of display contents respectively. These lamps are a "taring" lamp (33), a "subtracting tare" lamp (34), a 10 gr lamp (35), a 100 gr lamp (36) and a 1 Kg lamp (37), the lamps (35) to (37) indicating the standards of unit costs, a set lamp (38), an "aggregate number of issue" lamp (39), a "date of processing" lamp (40), a "term of availability" lamp (41), a section lamp (42), a commodity lamp (43), a zero point indication lamp (44), a power failure/error lamp (45), a correction lamp (46), an operation lamp (47), a count-up lamp (48) and a suspension lamp (49). On the other hand, in the lower part of the operation panel (10), there are disposed a unit cost and tare calling key (50), a unit cost storing key (51), a tare storing key (52), a commodity code key (53), a subtotal check key (54), a subtotal reckon key (55), a total check key (56), a total reckon key (57), a correct+key (58), a correct−key (59), a "term of availability" key (60) and an "aggregate number of issue" key (61). On the left of them, eight print control switches (62) are disposed which set whether the data of processing, unit cost, weight, price, section, term of availability, commodity and tare are to be printed or erased. Disposed below the print control switches (62) are a unit cost change-over switch (63) which sets the standard value of the unit cost display portion (13), an addition switch (64) which makes an addition control, a tare subtraction forcing switch (65) which controls the subtraction of tare, and a subtotal/total print switch (66) which changes-over the print of subtotal/total between the weight and price. Further, there are disposed a two-stage feed knob (67) which adjusts the amount of the two-stage feed of a label, three sensitivity adjustment knobs (68) which adjust the sensitivities of the respective sensors, and a sticking position adjustment knob (69) which adjusts the label sticking position of the commodity. An auxiliary lamp (70), a weighing lamp (71) and a sticking lamp (72) are disposed in correspondence with the sensitivity adjustment knobs (68).

(100) indicates a preset content change-over switch which effects change-over between weight preset and number preset and which is mounted inside the operation unit (6).

Referring now to FIG. 3, electronic circuit disposed in the operation unit (6) will be described. A central processing unit (73) (hereinbelow, termed CPU (73) is disposed, to which a ROM (74), a RAM (75), the load cell SL (4), a keyboard display controller (76), a printer controller (77) and an interrupt controller (78) are respectively connected. The keyboard display controller (76) has the switch (31) and other various switches and the numeral keys (19) and other various keys connected thereto, and is connected to the zero point indication lamp (44) and other various lamps and the display tubes (11). The printer controller (77) has the label printer (5) connected thereto, and is connected to various control portions for the start/stop of the conveyor $V_1$ (1), the start/stop of the conveyor $V_2$ (2), the start/stop of the conveyor $V_3$ (3), a $V_1$ timer, a $V_1$ start timer, a $V_3$ timer, feed, and a buzzer. Further, the $V_1$ sensor (7), the $V_2$ sensor (8), the $V_3$ sensor (9), the $V_1$ timer, the $V_1$ start timer, the $V_3$ timer, and the load cell SL (4) are connected to the interrupt controller (78).

FIG. 4 shows a RAM map. It includes an S register (79) which stores weight, unit cost and price, a display register (80) which stores and displays them, a ZT register (81), a count value register (82), a weight count register WC-3 (83) as well as a weight count register WC-2 (84), and a weight data register (85). In the upper part, flag columns (86) are provided. In these flag columns (86), there are set an automatic weighing flag APF, weighing F, print fixing flag for unit cost and weight IK-CWF, print fixing flag for price IK-PF, $V_1$ sensor (7) flag $V_1SF$, $V_1$ timer flag $V_1TF$, $V_2$ sensor (8) flag $V_2SF$, $V_2$ timer flag $V_2TF$, $V_3$ sensor (9) flag $V_3S_1F$ as well as $V_3S_2F$, automatic zero adjustment flag ACLF, ACL counter ACL-2F, print data F, conveyor error F, ZF, ACL end F, load cell SL start F, print ready F, etc.

Referring now to FIG. 5, the timings of various portions will be described. When the $V_1$ sensor (7) (indicated as $V_1S$) has detected the commodity, $V_1SF$ is erected, and simultaneously, the $V_1$ timer ($V_1T$) sets a fixed time T, whereupon $V_1TF$ is erected. Upon the time-up of $V_1T$, $V_1SF=0$ holds, and when the $V_2$ sensor (8) ($V_2S$) has detected the commodity, $V_2SF$ is erected and simultaneously the load cell SL (4) is started. Upon lapse of the time T after the fall of a first signal of the load cell SL (4), the conveyor $V_1$ (1) is started, and simultaneously, $V_2SF=0$ and $V_2TF$ is erected, weighing and other necessary operations being performed with a second signal of the load cell. Subsequently, when the commodity has been detected by the $V_3$ sensor (9) ($V_3S$), it is simultaneously carried out to erect $V_3S_1F$, to initiate the print operation and to start the $V_3$ timer ($V_3T$). In a set time by the $V_3$ timer, the label feed is executed at the same time as the termination of the print. After the label feed has terminated, the label is stuck (at Stick) upon the set-up of the $V_3$ timer subject to $V_3S_2F=1$ which is formed by a main routine to be stated later. A part indicated as INT HOLD signifies that various interruptions to be stated later are executed.

The various interrupting operations will be described with reference to FIGS. 6 to 12. First, FIG. 6 shows the interrupt INT $V_1S$ of the $V_1$ sensor (7). Under this state, $V_1SF=1$ is established, and whether or not $V_1TF$ stands erect is checked. If it stands erect, the conveyor $V_1$ (1) is stopped to inhibit the sending-in of the commodity. If it does not stand erect, whether or not $V_2SF$ stands erect is checked. Since $V_2SF=1$ signifies the presence of the commodity on the conveyor $V_2$ (2), the conveyor $V_1$ is stopped. At $V_2SF=0$, the $V_1$ timer is started, and whether or not ACLF stands erect is checked. When ACLF=0, a return is made. ACLF=1 signifies that the zero point adjustment ought to be ceased because the commodity has flowed in. Therefore, the ACL end F is made 1 (one), the load cell start is turned "off", and the return is made.

Next, FIG. 7 shows the interrupt INT $V_1T$ of the $V_1$ timer. At this time, $V_1TF=1$ is established and $V_1SF=0$ is established, whereupon a return is made.

FIG. 8 shows the interrupt INT $V_2S$ of the $V_2$ sensor (8). $V_2SF=1$ is established and $V_1TF=0$ is established, and whether or not the weighing F stands erect is checked. If the weighing F=1, the print ready F is made 1 (one), the load cell SL (4) is started and a return is made. If the weighing F=0, the SL start F=1 is established, whereupon the load cell SL (4) is started and the return is made.

FIG. 9 shows the interrupt INT $V_2T$ of the $V_2$ timer. $V_2TF=1$ is established, $V_2SF=0$ is established, and whether or not $V_1SF$ stands erect is checked. At this time, if $V_1SF=1$, the $V_1$ timer is started, the conveyor $V_1$ (1) is started, the load cell SL start is turned "off" and a return is made. If $V_1SF=0$, the load cell SL start is turned "off" and the return is made.

FIG. 10 shows the interrupt INT $V_3S$ of the $V_3$ sensor (9). $V_3S_1F=1$ is established, $V_2TF=0$ is established, and whether the weighing F stands erect is checked. If the weighing F=0, that is, the print is fixed, then the print data F=1 is established, the $V_3$ timer is started and a return is made. If the weighing F=1, the $V_3$ timer is started and the return is made.

FIG. 11 shows the interrupt INT $V_3T$ of the $V_3$ timer. The erection of $V_3S_2F$ is waited, and when $V_3S_2F=1$ has held, the label is splayed, $V_3S_2F=0$ is established and a return is made.

FIG. 12 shows the interrupt of the load cell SL. When the load cell SL interrupt has been received, data are stored, and whether or not APF stands erect is checked. If APF=0, a return is made. If APF=1, whether or not the weighing F stands erect is checked. Now, if the print ready F=1 holds under the automatic weighing state of the weighing F=1, the print ready F=0 and the print data F=1 are established, the weight data are put into the weight count register WC-3 (83), ACLF=0 and ACL counter=0 are established, the $V_1$ start timer 1 is started and the return is made. On the other hand, when the weighing F=1 and the print ready F=0, ACLF is checked. If ACLF=1, the ACL counter is subjected to +1, and whether the ACL counter=2 is checked. If the ACL counter=2, ACL counter=0 and ACL−2F=1 are established, the weight data are put into the weight count register WC-3 (83), whereupon subject to ACL end F=0, a return is made, and subject to ACL end F=1, the return is made after establishing ACLF=0 and ACL end F=0. Unless ACL counter=2 in the previous step, ACL−2F=0 is established and the weight data are put into the weight count register WC-2 (84), whereupon subject to ACL end F=0, the return is made, and subject to ACL end F=1, the return is made after establishing ACLF=0 and ACL end F=0.

When ACLF=1 at the print fixing of the weighing F=0, the same routine is traced. Further, when the weighing F=0 and ACLF=0, the weighing F is checked again. If the weighing F=1, a return is made. If the weighing F=0, the load cell SL start F is checked, whereupon subject to the load cell SL start F=0, a return is made, and subject to the load cell SL start F=1, the return is made after establishing SL start F=0 and starting the $V_1$ start timer.

Referring now to FIG. 13, the main routine will be described. After closing the power switch (27), an I/O is reset, and the various portions are initialized. After a point Ⓐ, work switches and keys are successively loaded. The work switch load is to load the change-over states of the change-over switches (31) and (32), and it is loaded if APF=1 holds in the automatic issue state, if the weighing F=1 holds in the weighing state, if IK−@WF=1 holds in the print fixing of unit cost and weight, if IK−PF=1 holds in the print fixing of price, etc. The key load is to load if the various keys of the preset key (24), numeral keys (19), erase key (23), execute key (20), operate/stop key (28), etc. are pushed.

Subsequently, the various flags of APF, $V_1$SF, $V_1$TF, $V_2$SF, $V_2$TF, $V_3S_1$F, $V_3S_2$F and ACLF are checked. When APF=0 holds or any one of $V_1$SF, $V_1$TF, $V_2$SF, $V_2$TF, $V_3S_1$F, $V_3S_2$F and ACLF stands erect, the flow shifts to checking whether or not the next APF stands erect. Only in case where APF=1, $V_1$SF=0, $V_1$TF=0, $V_2$SF=0, $V_2$TF=0, $V_3S_1$F=0, $V_3S_2$F=0 and ACLF=0, the load cell SL (4) is started after establishing ACLF=1 and ACL counter=0. That is, when the presence of the commodity on the conveyor is not being decided at the automatic issue, the load cell SL (4) is started for the zero point adjustment (auto-clear).

Parts indicated by dotted lines signify that works which are not especially pertinent to this invention, such as article name readout and unit cost change-over switch readout, are performed. Thereafter, APF is checked again, and if APF=0 holds, the flow returns to A, whereas if APF=1 holds, it is checked if the data of the load cell SL (4) are coming. Unless they are coming, the flow returns to Ⓐ, and if they are coming, it is checked if ACL−2F=1 holds. At this time, ACL−2F=1 signifies that the data coming are ones for the zero point adjustment, and ACL−2F=0 signifies that the data coming are not ones for the zero point adjustment. Now, if ACL−2F=1 holds, ACL−2F=0 is established, and whether the data are to be made the zero point is checked. The check contents will be stated later with reference to NOTE 1. If the data are ones to be made the zero point, the content of the weight count register WC-3 (83) is put into the ZT register (81), and the flow shifts to the check of the weighing F. In case where the data are unsuitable for the zero point, the conveyors $V_1$ (1), $V_2$ (2) and $V_3$ (3) are stopped, the conveyor error F=1 is established, the error lamp (45) is flickered, and the flow returns to the point Ⓐ. This situation is such an abnormal state that the hand has touched the conveyor $V_2$ (2) or any other thing than the commodity has overlain the latter, as no detection has been made. Therefore, after removing the cause for the abnormality, the operate/stop key (28) is pushed to restart the running. When ACL−2F=0 as above stated holds, whether or not the print data F stands erect is checked. When the print data F=0 holds, the flow returns to Ⓐ, and when the print data F=1 holds, the flow shifts to the check of the weighing F.

There will now be explained the check as to whether or not the data are ones to be made the zero point, that is, NOTE 1. First, it is checked if the data lie within the measurable range of the load cell SL (4), in other words, if they correspond to an appropriate weight which is not an overweight. If they correspond to the overweight, they are naturally an error. Unless they correspond to the overweight, whether the difference between the contents of the weight count register WC-3 (83) and the weight count register WC-2 (82) is 10 or less. The numerical value 10 is, for example, a count graduation, and in order to allow for safety, it has been previously set that the difference on the order of 10 or less is permitted. When the difference is greater than 10, it becomes the error, and when it is not greater than 10, whether the difference between the contents of the ZT register (81) and the weight count register WC-3 (83) is 100 or less is checked. This check examines if there is an abnormally sharp fluctuation between the preceding zero point and the new zero point. When the range of 100 is exceeded, the error is decided, and when the difference lies within the range, $K \leq (WC-3) \leq K'$ is checked. This check is made from the viewpoint that, within the weighable range of the load cell SL (4), values allowable as the zero point ought to fall within a fixed range. The relationship between the constants K and K' are set to be $K'-K=2000$ or so in terms of the count value. Unless the above-mentioned condition is fulfilled, the error is decided, and if it is fulfilled, the state in which the content of the weight count register WC-3 (83) is put into the ZT register (81) holds as described previously.

After whether or not the zero point adjustment is to be made has been discriminated in this manner, the weighing F is checked. If the weighing F=0 holds, the situation is the print fixing, and hence, the flow shifts to the check routine of the print data F to be described later. If the weighing F=1, the situation is the automatic weighing, and hence, the content of the ZT register (81) is subtracted from that of the weight counter register WC-3 (83), the result being put into the count value register (82). At the zero point adjustment, the count value is zero, and at the weighing of the commodity, it is a number corresponding to the weight thereof. The weight is evaluated by multiplying the count value and the minimum weighing interval, and this weight is multiplied by the unit cost to find the price, which is displayed. Also in this case, at the zero point adjustment, the display is zero because the count value is zero. Subsequently, it is checked if the count value is zero. If it is zero, the zero point indication lamp (44) is put out.

Subsequently, whether the print data F=1 holds is checked as stated previously. The print data F=0 signifies that the data are not ones to be printed, and hence, the flow returns to Ⓐ. The print data F=1 signifies the label issue state, and hence, it is waited that $V_3S_1F=1$ will hold. When $V_3S_1F=1$ has held, the print on the label is made and the label feed (FEED) is made, to perform the label issue. $V_3S_2F=1$ is established, $V_3S_1F=0$ is established, and the print data F=0 is established, whereupon the flow returns to Ⓐ.

As set forth above, in the apparatus wherein commodities are sequentially transferred to the conveyor $V_2$ to measure their weights and labels corresponding to the weights are issued, this invention consists in automatically performing the zero point setting by catching the timings at which the transportation of the commodities ceases intermittently. Therefore, even when the zero point of the load cell has fluctuated, the zero point setting is automatically made at a suitable timing, and weight data are obtained on the basis of the zero point set anew, so that accurate weight measurements can be performed at all times. At any abnormality in this case, the state can be known. Even in case where no data from the load cell is required under the print fixing state, the load cell is operated from above the conveyor $V_2$, whereby the zero point setting is always made. Therefore, even when the operation is changed-over to the automatic weighing, an accurate weighing state can be immediately established.

We claim:

1. An automatic weighing method, comprising the steps of:
   moving the object to be weighed on three consecutive conveyers;
   sensing the presence or absence of the object on each of the three conveyers;
   controlling the first conveyer in accordance with the presence of the object on the second conveyer to prevent the passage of additional objects onto the second conveyer when the object is present on the second conveyer;
   weighing the second conveyer while said object is absent from the second conveyer and producing a first weight signal by means of a load cell;
   weighing the second conveyer and said object while said object is present on the second conveyer and producing a second weight signal by means of a load cell;
   storing a zero point weight on the basis of the first weight signal as an indication of the tare weight of the second conveyer;
   setting the weight of the object into a register on the basis of the second weight signal and the zero point weight; and,
   labeling said object with the weight label while present on the third conveyer.

2. An automatic weighing method, according to claim 1, further comprising:
   fixing the print for said weight label, wherein said conveyers continue to move during the step of fixing.

3. An automatic weighing method, according to claim 1 or 2, wherein said load cells is operative during the step of fixing.

4. An automatic weighing method, according to claim 3, wherein the step of setting a zero into said register occurs during the step of fixing.

5. An automatic weighing method, according to claim 1, further comprising:
   sounding an alarm if the weight measured exceeds a predetermined limit.

6. An automatic weighing apparatus comprising:
   a first conveyer for bringing in a commodity;
   a second conveyer for receiving the commodity from said first conveyer;
   a third conveyer for receiving the commodity from said second conveyer;
   first, second and third sensors each disposed adjacent to one of the three conveyers and having an output for indicating when a commodity is present on the adjacent conveyer;
   control means for preventing the transfer of additional commodities from the first conveyer to the second conveyer when the second sensor indicates the presence of the commodity on the second conveyer;
   means connected to said second conveyer for weighing the commodity and said second conveyer and producing a weight signal;
   first storage means for receiving a first weight signal when the second sensor indicates the absence of the commodity on the second conveyer and storing a zero point weight in response thereto;
   second storage means for receiving a second weight signal when the second sensor indicates the presence of the commodity on the second conveyer and storing a commodity weight on the basis of the second weight signal and the zero point weight;
   labeling means positioned adjacent to said third conveyer so as to apply a label indicating the commodity weight to the commodity while carried by said third conveyer.

* * * * *